United States Patent [19]

DiFonzo

[11] Patent Number: 4,800,824
[45] Date of Patent: Jan. 31, 1989

[54] PYROLYTIC INCINERATION SYSTEM

[75] Inventor: Mark A. DiFonzo, Brookfield, Wis.

[73] Assignee: Aqua-Chem, Inc., Milwaukee, Wis.

[21] Appl. No.: 107,099

[22] Filed: Oct. 13, 1987

[51] Int. Cl.⁴ .............................................. F23D 14/00
[52] U.S. Cl. ................................. 110/235; 110/165 R; 110/173 R; 110/177; 110/213; 110/214; 110/254; 110/259
[58] Field of Search ..................... 110/235, 173 R, 177, 110/181, 212, 213, 214, 259, 165 R, 242, 254, 245

[56] References Cited

U.S. PATENT DOCUMENTS

| | | | |
|---|---|---|---|
| 3,669,040 | 6/1972 | Clements | 110/173 R X |
| 4,003,714 | 1/1977 | Foglino et al. | 110/173 R X |
| 4,074,638 | 2/1977 | Miller | 110/259 |
| 4,332,218 | 6/1982 | Stewart et al. | 110/245 X |
| 4,452,152 | 6/1984 | John et al. | 110/235 |
| 4,466,359 | 8/1984 | Weber et al. | 110/213 |
| 4,542,703 | 9/1985 | Przewalski | 110/213 X |
| 4,628,868 | 12/1986 | Eaton | 110/245 X |

Primary Examiner—Edward G. Favors
Attorney, Agent, or Firm—John C. Cooper, III; C. Thomas Sylke; Fred Wiviott

[57] ABSTRACT

An incineration system utilizes a circular cross-section pyrolysis chamber in which waste materials are gasified. A flat cast iron hearth serves as the floor of the pyrolysis chamber and has a number of small holes which are raised above the general hearth level by a number of nipples. The bolted front head of the chamber has a vertically movable front door. When raised, the hinged door assembly may be opened by unscrewing a pair of locking mechanisms which seal the door to a vertically movable frame. Ash removal may be accomplished by partially raising the entire structure, rather than opening the door. The ash ram is rectangular, covers a substantial area of the chamber floor when extended, and utilizes a unique cable and cylinder ram moving system. An air plenum above the chamber also acts as a platform, allowing inspection and maintenance to take place on top of the chamber. Gasified waste material leaving the pyrolysis chamber is ignited and burned in a thermal reactor utilizing reverse rotation and forced air combustion to effectively mix and burn the waste material after gasification.

19 Claims, 8 Drawing Sheets

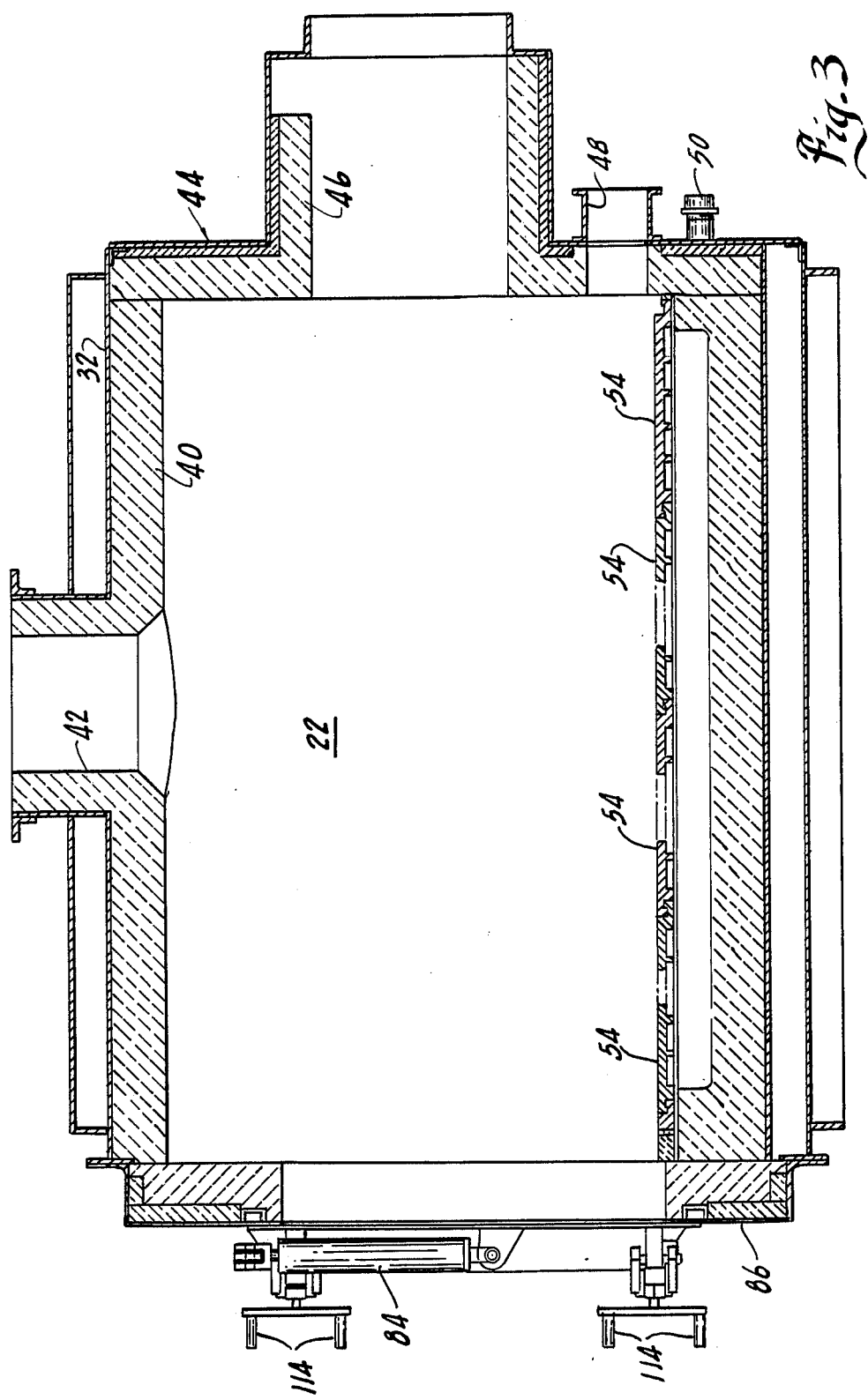

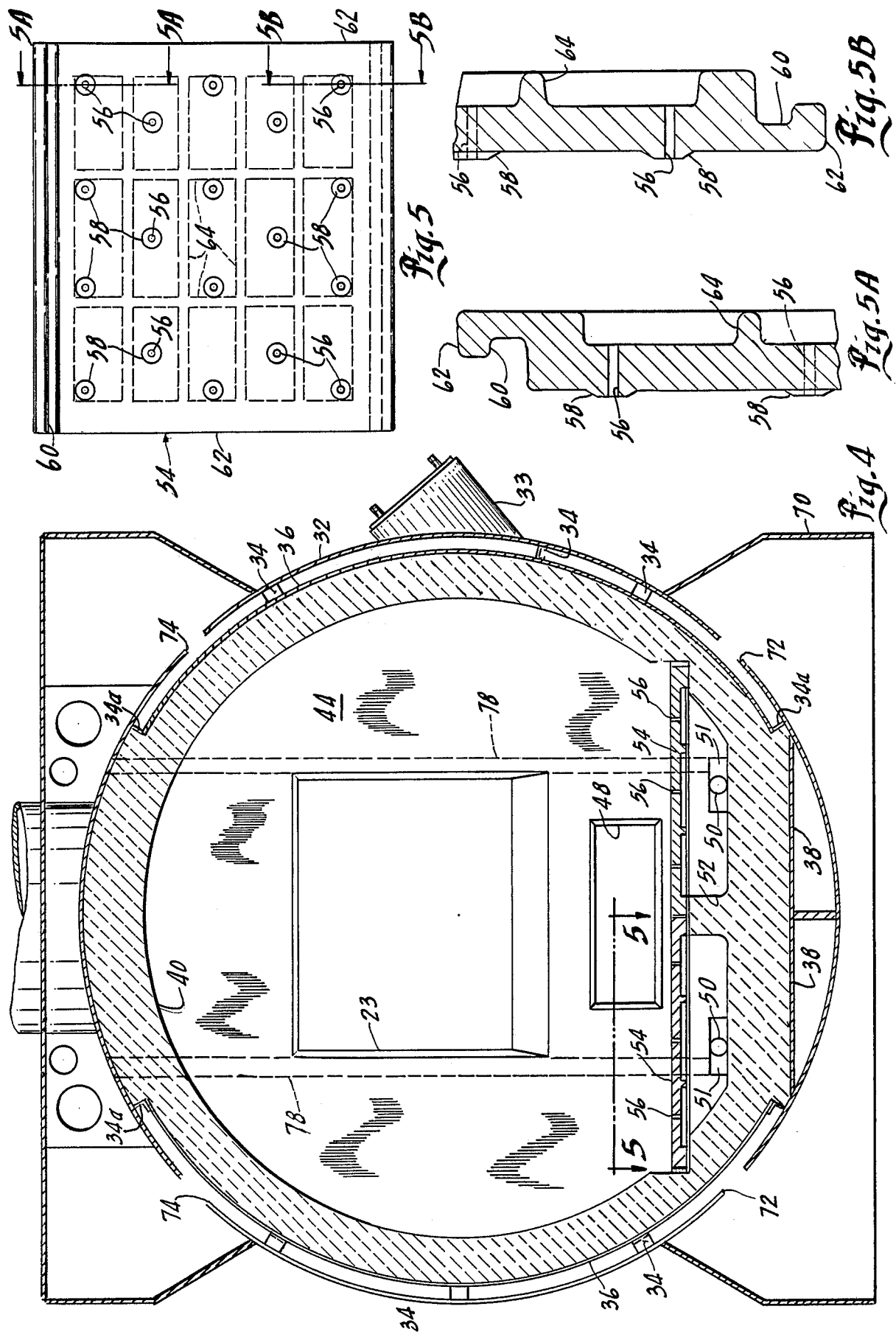

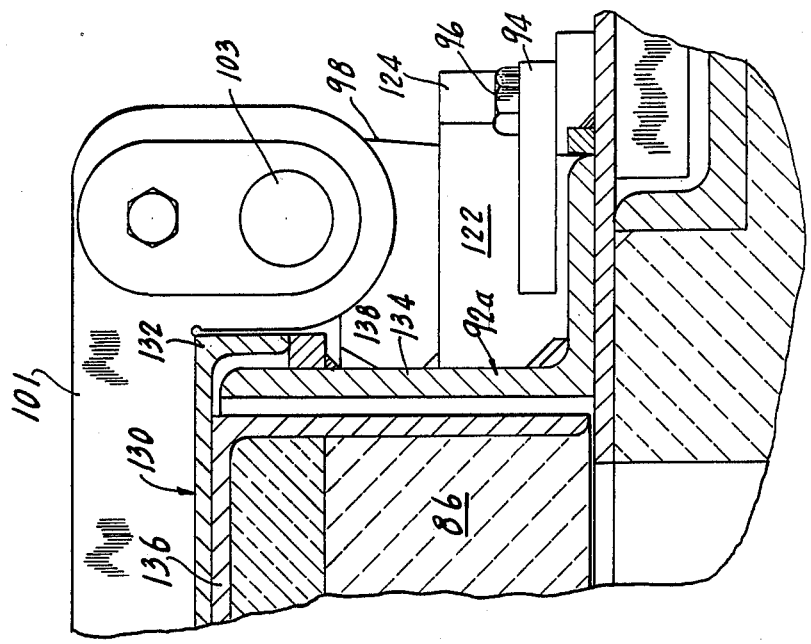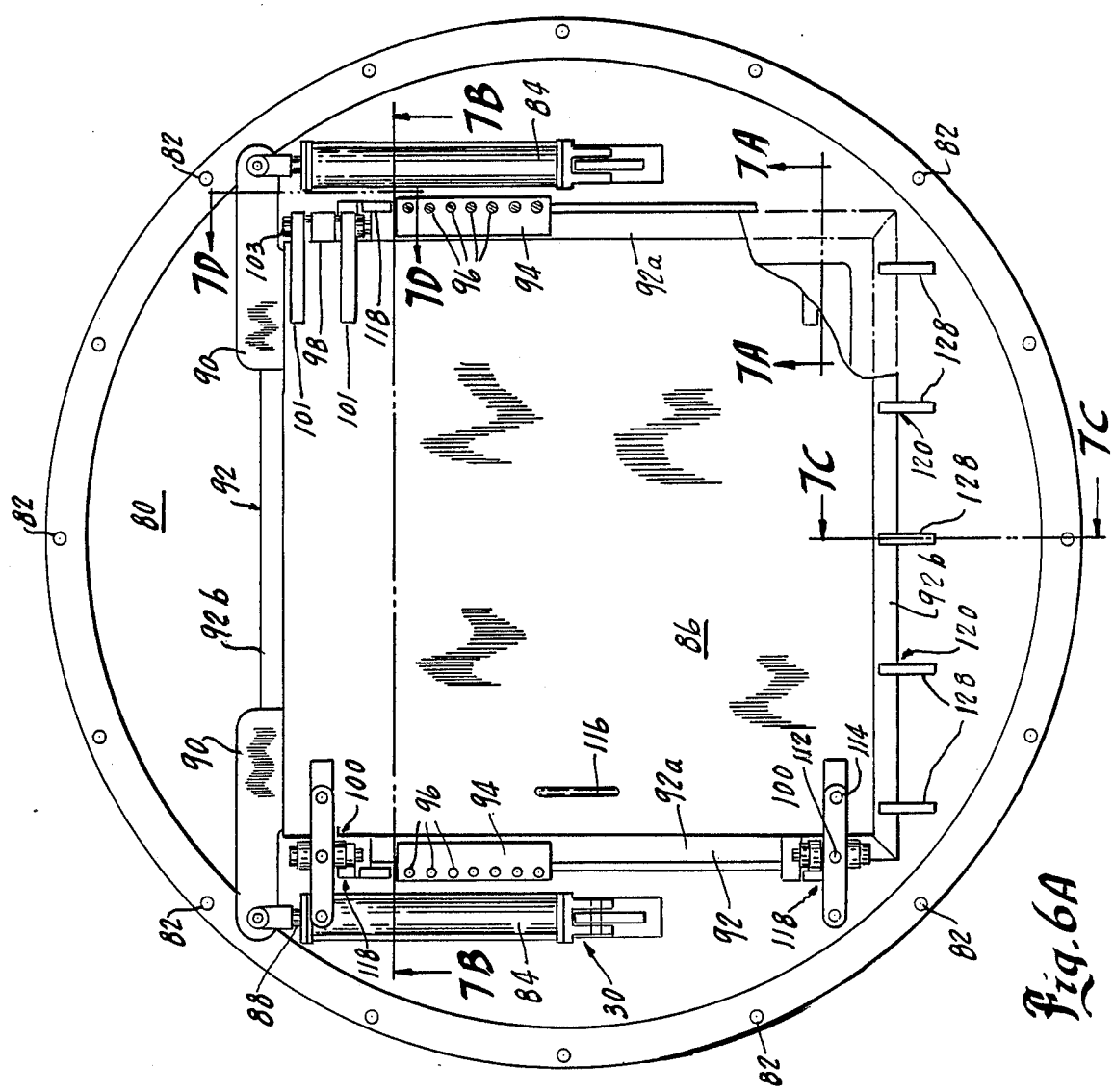

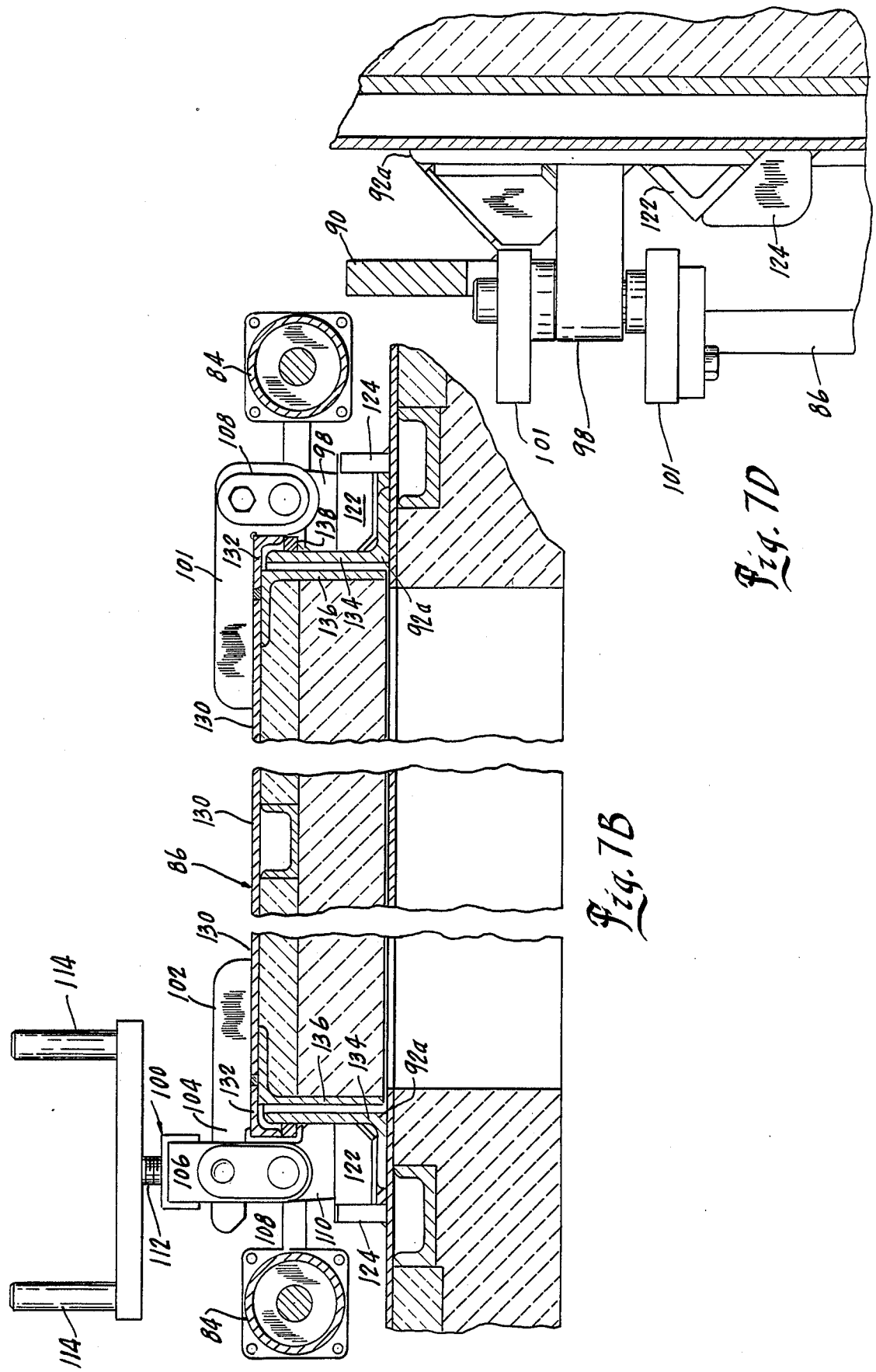

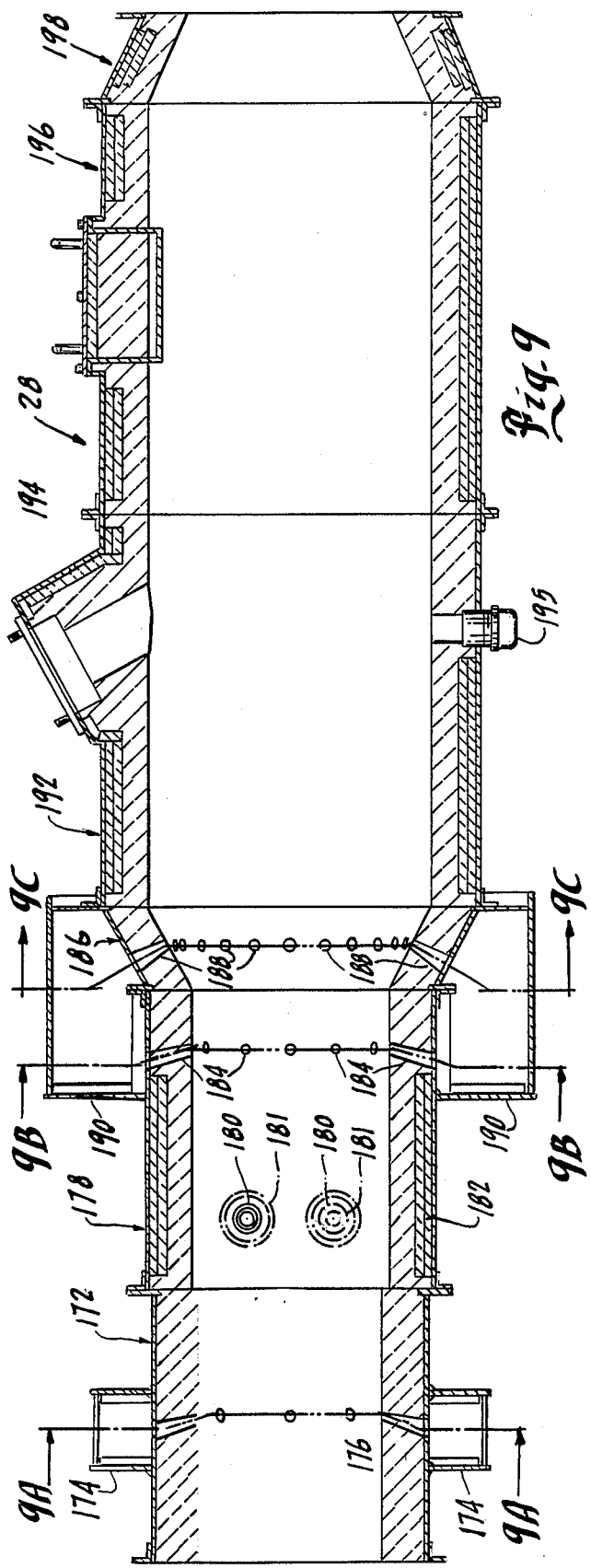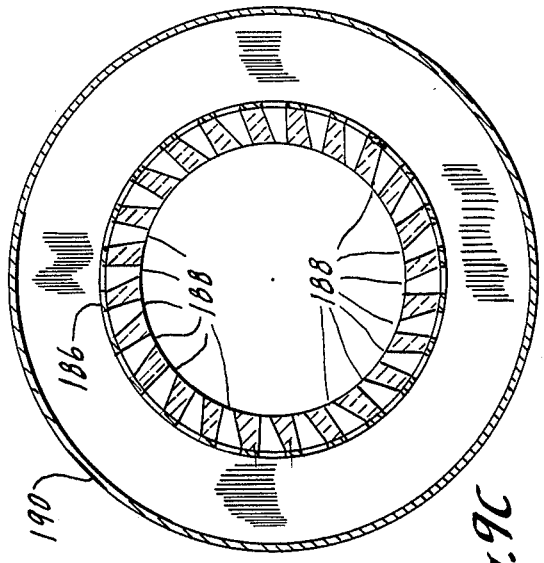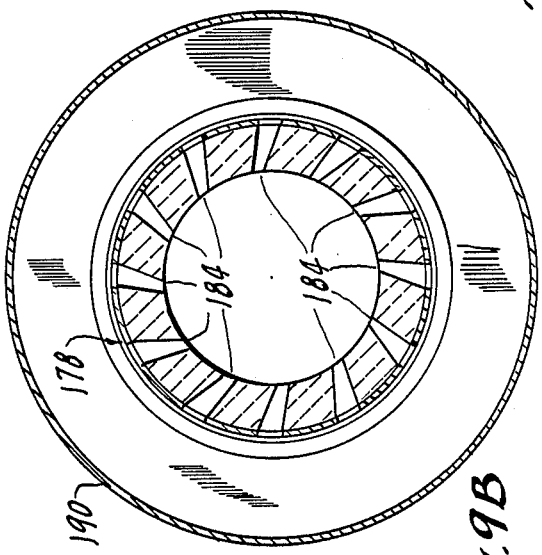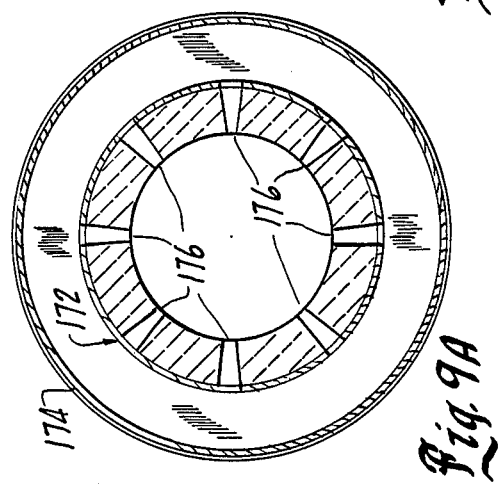

PYROLYTIC INCINERATION SYSTEM

BACKGROUND OF THE INVENTION

1. Field of the Invention

The present invention relates generally to the art of incineration systems used to burn waste materials. More specifically, the present invention relates to an improved system for incinerating waste material and disposing of the ash and waste gases efficiently.

2. Description of Related Area of Art

Assignee of the present application is aware of a related company in Europe which has been selling pinhole hearths for approximately two years.

OBJECTS AND SUMMARY OF THE INVENTION

It is a primary object of the present invention to provide an improved incineration system which utilizes pyrolytic gasification of waste materials to subsequently be burned in a thermal reactor yielding a minimum of waste gas and ash material.

It is another object of the present invention to provide an incineration system with an improved pyrolysis chamber which is both structurally stronger than those in the past and easier to produce.

It is a different object of the present invention to provide an improved incineration system utilizing a simpler and more effective combustion air pre-heating system which also maintains a cool skin temperature thereby eliminating excessive room temperatures in indoor installations and reduces paint problems.

It is still a different object of the present invention to provide an improved incineration system having a platform/air plenum on top of the main chamber which can be used as a platform for service and inspection and which remains cool during operation.

It is still another object of the present invention to provide an improved incineration system which utilizes a bolted front head on the main pyrolytic chamber so that proper sealing may be achieved with minimal, if any, leaking and yet is detachable in case of major repairs.

It is still a different object of the present invention to provide an improved incineration system having a manual access door incorporating an intergral hydraulic ash door which eliminates large swing door and sagging problems, swivel hydraulic connections which generally leak, substitutes a steel labyrinth seal and cam locking for older rope seals, reduces overall unit length by eliminating the need for a large swing door clearance, eliminates the need for a separate ash removal door and eliminates the extended transition housing for a standard ash removal.

It is but another object of the present invention to provide an improved incineration system utilizing a flat cast iron hearth which eliminates the need for air tubes, provides uniform distribution of underfire air over the entire hearth area, has a non-slagging surface, has individual plates which can be replaced, provides a large flat grate surface for combustion material allowing uniform pyrolysis and complete burndown of carbon to sterile ash, minimizes corrosion of the tank structure due to condensing steam underneath the plates of the hearth, provides a flat working surface for ash removal, permits use of metal tools for cleaning which would ordinarily harm a refractory surface.

Yet another object of the present invention is to provide an improved incineration system having an ash ram which allows an increased ram head area to remove more material, matches the flat upper structure of the hearth, is wider so that less material can escape on the sides of the bed and simplifies the structure of the ash ram to reduce possible maintenance problems.

Still another object of the present invention is to provide an improved incineration system utilizing a cable and cylinder ash ram moving system which permits movement of the ash ram through the main pyrolysis chamber without exposing the cylinder or piston or any parts thereof to any significant heat while utilizing a system that does not cause high torquing or overleading of the ash ram.

One more object of the present invention is to provide an incineration system having a thermal reactor design using forced air combustion so that all exposed flame is eliminated, dependency on room air supply is greatly reduced, combustion efficiency is improved due to higher control over mixing, turbulence and the air/fuel ratio and federal, state and local regulations may be complied with with little or no guessing as to temperature and time requirements.

How these and further objects of the invention are accomplished will be described by reference to the following description of the preferred embodiment of the present invention taken in conjunction with the FIGURES. Generally, however, the objects are accomplished in an incineration system utilizing a circular cross-section pyrolysis chamber in which waste materials are gasified. A flat cast iron hearth therein serves as the floor of the pyrolysis chamber. The cast iron hearth has a number of small holes which reduce slagging and are raised above the general hearth level by a number of nipples for quick and easy location. The front head of the pyrolysis chamber is bolted on to eliminate leaking encountered with earlier rope seals. A front door assembly is built onto the front head, the door assembly being vertically movable by means of hydraulic cylinders mounted to the head. When the door assembly is in its lower position, it is held in place and sealed by a number of cam locks. The door assembly may be opened by unscrewing a pair of locking mechanisms which seal the door to a vertically movable frame. Ash removal may be accomplished by simply raising the entire structure, rather than opening the door. The ash ram of the present invention is a rectangular ram covers a substantial area of the pyrolysis chamber floor (i.e., the flat cast iron hearth) and utilizes a unique cable and cylinder ram moving system. A series of pulleys are used in connection with the cable so that extension of a hydraulic piston moves the ash ram inwardly and through the pyrolysis chamber without exposing any of the cylinder or piston elements to high levels of heat. Likewise, using the pulleys, twice the travel length of the piston extension may be accomplished, thereby reducing the required length of the piston and any torque effects on the piston caused in earlier devices by using tandem cylinders. The air plenum above the pyrolysis chamber also acts as a platform, thereby allowing inspection and maintenance to take place on top of the pyrolysis chamber and maintaining a relatively cool temperature for that platform. The pyrolysis chamber itself is circular in cross-section, which increases the strength of the chamber as well as the ease of manufacture. In addition, it is easier to add brick or to pour refractory material in the chamber. Finally, the gasified waste material leaves the pyrolysis chamber and is actually ignited and burned in a thermal reactor. The thermal reactor utilizes reverse rotation and forced air combustion to effectively mix and burn the waste material after gasification. This is accomplished by using combustion air jets which reverse the rotation of the combustion mixture several times during combustion and stoichiometrically control the burning. Because the combustion air and fuel ratios are very closely controlled and the dependency on room air supply is reduced, the efficiency of the burning is greatly improved and makes it easier for an operator comply with emmissions regulations.

Other variations and modifications of the invention will become apparent to those skilled in the art after reading the specification and are deemed to fall within the scope of the present invention if they fall within the scope of the claims which follow the description of the preferred ebodiment.

DESCRIPTION OF THE DRAWINGS

FIG. 3 is a side cross-sectional view of the pyrolysis chamber and front door assembly taken along the line 3—3 of FIG. 2;

FIG. 4 is a front cross-sectional view of the pyrolysis chamber taken along the line 4—4 of FIG. 1;

FIG. 5 is a top plan view of a hearth plate taken along the line 5—5 of FIG. 4;

FIG. 5A is a cross-sectional view of a part of the hearth plate taken along the line 5A—5A of FIG. 5;

FIG. 5B is a partial cross-sectional view of a hearth plate taken along the line 5B—5B of FIG. 5;

FIG. 6A is a front plan view of the front door assembly taken along the line 6—6 of FIG. 1;

FIG. 7A is a partial and cross-sectional view of the front door assembly taken along the line 7A—7A of FIG. 6A.

FIG. 7B is a partial cross-sectional view of the front door assembly taken along the line 7B—7B of FIG. 6A;

FIG. 7C is a partial cross-sectional view of the front door assembly taken along the line 7C—7C of FIG. 6A;

FIG. 7D is a partial cross-sectional view of the front door assembly taken along the line 7D—7D of FIG. 6A;

FIG. 9 is a cross-sectional view of the thermal reactor taken along the line 9—9 of FIG. 1;

FIG. 9A is cross-sectional view of the premixing section of the thermal reactor taken along the line 9A—9A of FIG. 9;

FIG. 9B is a cross-sectional view of the ignitor section of the thermal reactor taken along the line 9B—9B of FIG. 9;

FIG. 9C is a cross-sectional view of the expansion section of the thermal reactor taken along the line 9C—9C of FIG. 9.

DESCRIPTION OF THE PREFERRED EMBODIMENT

Figure 1:
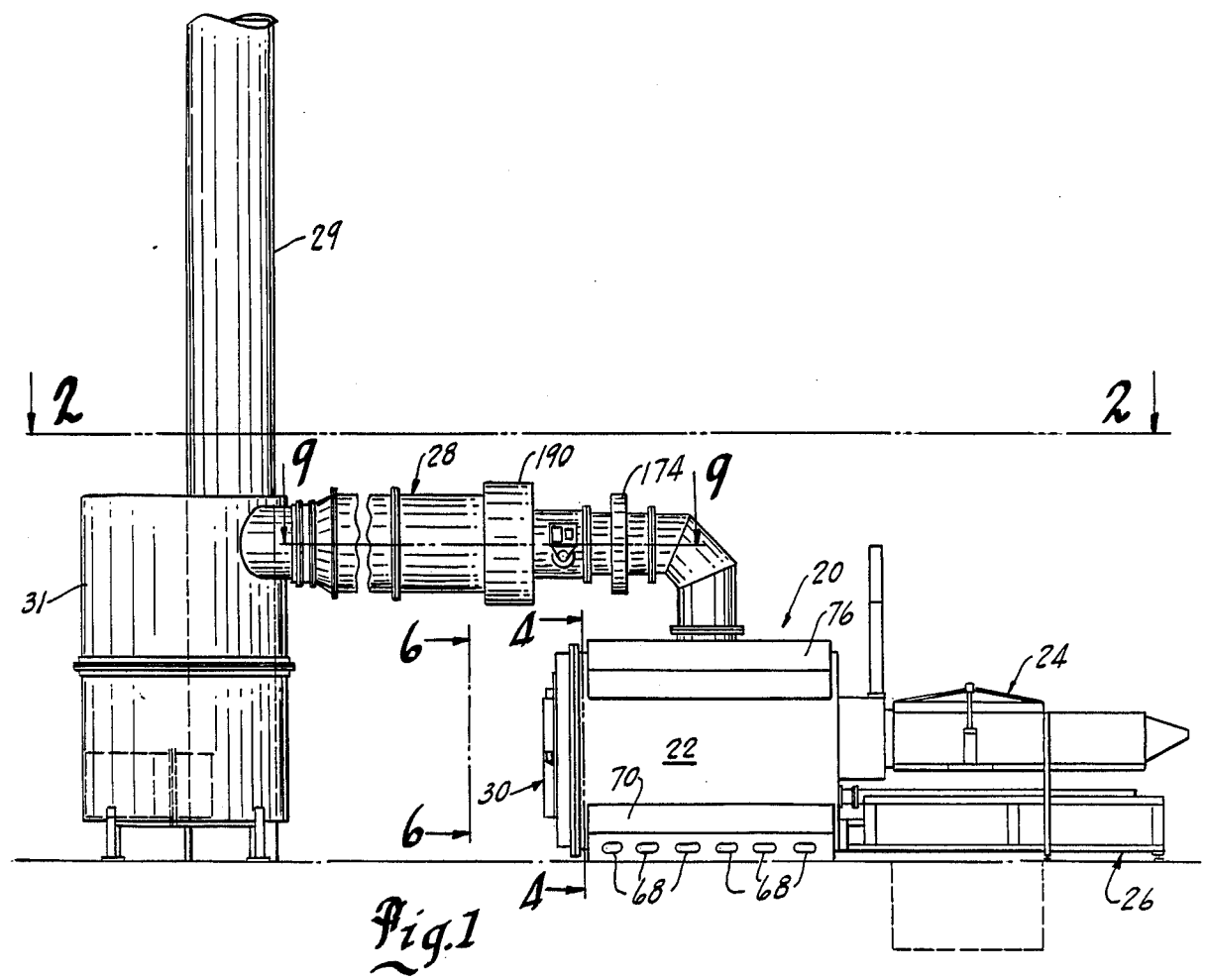
FIG. 1 is a side elevation view of an incineration system incorporating the present invention.
Figure 2:
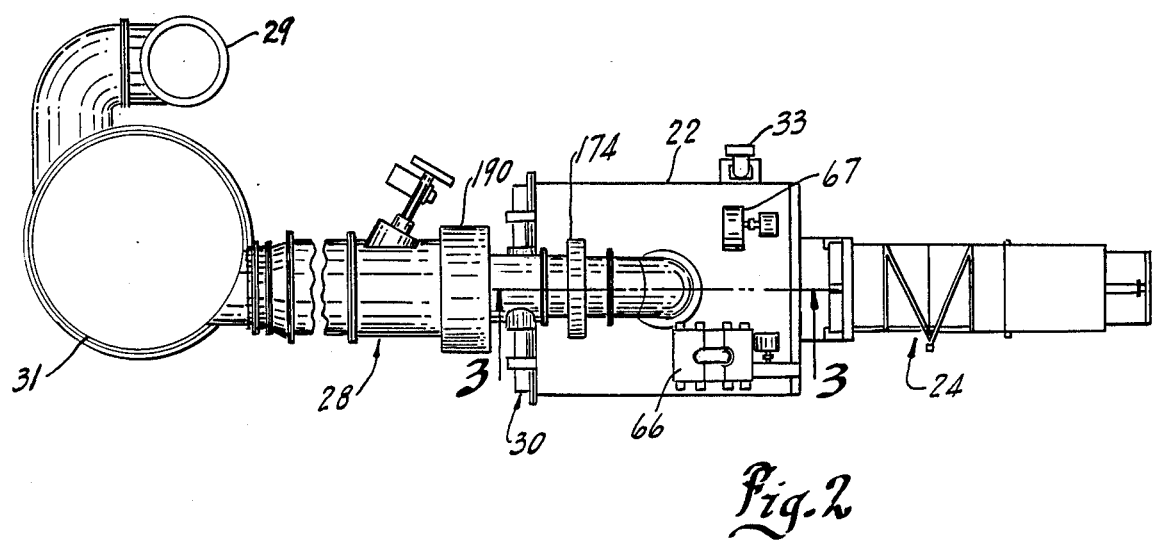
FIG. 2 is a top plan view of an incineration system incorporating the present invention taken along the line 2—2 of FIG. 1.
Figure 1C:
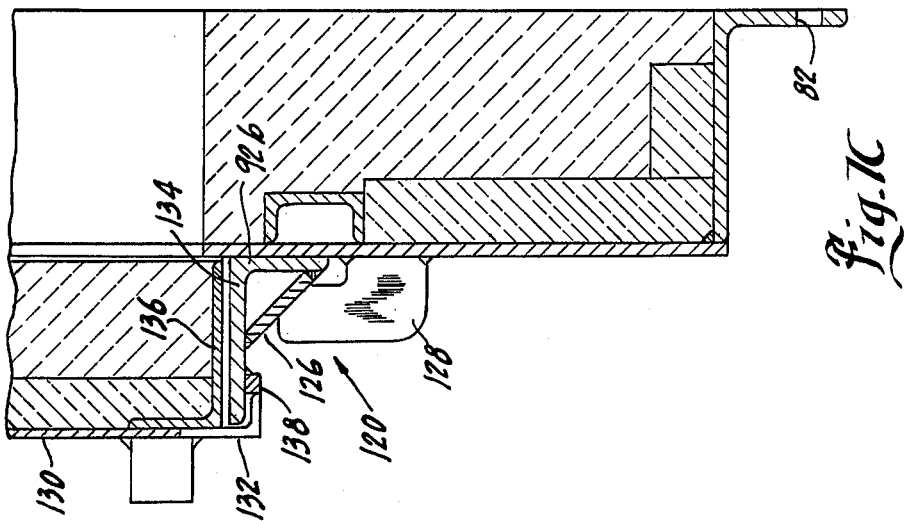

The preferred embodiment of the present invention is illustrated in FIGS. 1 and 2. An incinerator 20 includes a pyrolysis chamber 22 with several appendages attached thereto. A waste feed apparatus 24 and ash removal apparatus 26 are adjacently mounted to the rear head of the main chamber 22. The thermal reactor unit 28 is mounted on top of the main chamber 22. An air preheating system also serves to air-cool the main chamber 22. Finally, a new front door and front head assembly 30 are incorporated into the front of main chamber 22.

Main Chamber

The main chamber 22 of incinerator 20 is shown in more detail in FIGS. 3 and 4. Chamber 22 is generally defined by cylindrical wall 32. A rear head 44 has a waste feed opening 23 and ram entry 48. A number of mounting brackets 34 are found along the inner sides of wall 32. These brackets 34 hold curved walls 36 which are sealed at their front and rear edges (not shown) and at their top and bottom edges with angled brackets 34a. Lower spacers 38 define a flat floor along the length of the chamber 22.

The inside of the chamber 22 is lined with refractory material 40. An upper hole 42 is provided for the thermal reactor assembly 28. The front head of chamber 22 will be discussed in more detail below. The rear head 44 is also lined with refractory material 40 and has a passageway 46 through which waste may be fed by the feeder apparatus 24, a rectangular entry port 48 for the ash removal apparatus 26, and a smaller pair of holes 50 designed to provide access for inspection, and injection of steam into the underfire air system.

A horizontal air channel header and a pair of vertical air channels 78 are employed to distribute a portion of the preheated air as underfire combustion air in the pyrolysis chamber 22 through the hearth described in more detail below. These air channels 78 are located on the rear wall 44 and serve to cool the corners of the feeder 46 for waste material and the rear wall which can achieve high temperatures if not cooled.

The bottom of chamber 22 is generally flat refractory material 40 that has a longitudinal support 52. Support 52 provides a central support for a number of plates 54 that define the hearth of incinerator 20. A hearth plate 54 is shown in detail in FIG. 5.

The design of chamber 22 is such that liquid and solid waste materials fed into the chamber by feed system 24 are gasified as opposed to being burned in an open flame. This means that the gasified materials may be burned at a later time. Thermal reactor 28 is provided in the preferred embodiment to accomplish this. A burner 33 may also be incorporated into pyrolysis chamber 22 to eliminate additional waste.

Cast Iron Hearth Plates

An individual hearth plate 54 is a generally flat piece of cast iron in the preferred embodiment. A number of air holes 56 are distributed throughout plate 54 to provide an even flow of combustion air to chamber 22, avoiding "hot spots", or concentrated burn areas, across the hearth. As seen in FIGS. 5A and 5B, each of the holes 56 is surrounded on the upper side of plate 54 by a nipple 58. Nipples 58 help in finding the holes 56 for cleaning as well as preventing molten material from getting into the holes 56.

The hearth configuration using plates 54 allows one to replace individual plates when necessary. Plates 54 have interlocking edges 60 extending laterally. The longitudinal edges 62 rest on either support 52 or a groove 64 formed in the refractory material 40. The underside of plates 54 have ribs 64 which help support the plates.

As seen in FIGS. 5A and 5B, the sides of nipples 58 are tapered upwardly from the surface of the hearth plate 54 toward the upper edge of each aperture 56. This allows rakes and other cleaning equipment to be used without damage to the plates 54, the nipples 56 or the cleaning equipment itself.

These plates 54, having the holes 56 incorporated therein, eliminate the need for separate air tubes to provide combustion air for gasification of the waste materials. In addition, the distribution of underfire air is across the entire hearth area and is more even than in earlier devices. In addition, damage to the incinerator is minimized because metal tools can be used for cleaning without harm to the hearth and corrosion due to steam condensation is minimized.

Combustion Air Supply

The combustion air supply of the present invention utilizes atmospheric air both to cool the main combustion chamber 22 and to provide incinerator 20 with air for burning. A blower fan 66 and thermal reactor combustion air (TRCA) fan 67 on top of chamber 22 help draw air through inlets 68 in lower skirt 70. The air is then drawn up through holes 72 in the lower part of walls 32 and through the spaces formed by walls 32 and walls 36. Unlike earlier devices which used individual channels, this configuration requires fewer weld seams, is easier to brick or insulate, and permits holes to be cut or punched out (such as holes 72 and 74). In addition, the circular cross-section is stronger. Finally, the single wall 36 ensures more even and complete cooling of the chamber 22 as compared to a number of channels in the wall.

The heated air is drawn by fans 66 and 67 and convected into plenum 76 through upper holes 74 in wall 32. Blower fan 66 then transfers a portion of the air to interior passages 78 which allow for further heating and direct the air through holes 51 into the space between the hearth plates 54 and the lower refractory material 40. The heated air is then forced up through the holes 56 in plates 54. A majority of the preheated air is used in the thermal reactor plenums 174 and 190 described later and the remainder is used for burner air supply.

The air passing between walls 32 and 36 assists in cooling the refractory material lining the pyrolysis chamber 22. The cooling effect is very even due to the even distribution of air through the walls. This assists in keeping the temperature in the room in which the incineration system is kept to a minimum and reduces problems with paint blistering or peeling due to the excessive air temperatures on the outer skin of the incinerator. In addition, plenum 76 provides a stable and relatively cool platform on which one or more persons may work. Service and inspection may be performed on the platform while the incineration system is in operation.

Front Door Assembly

Figure 6B:
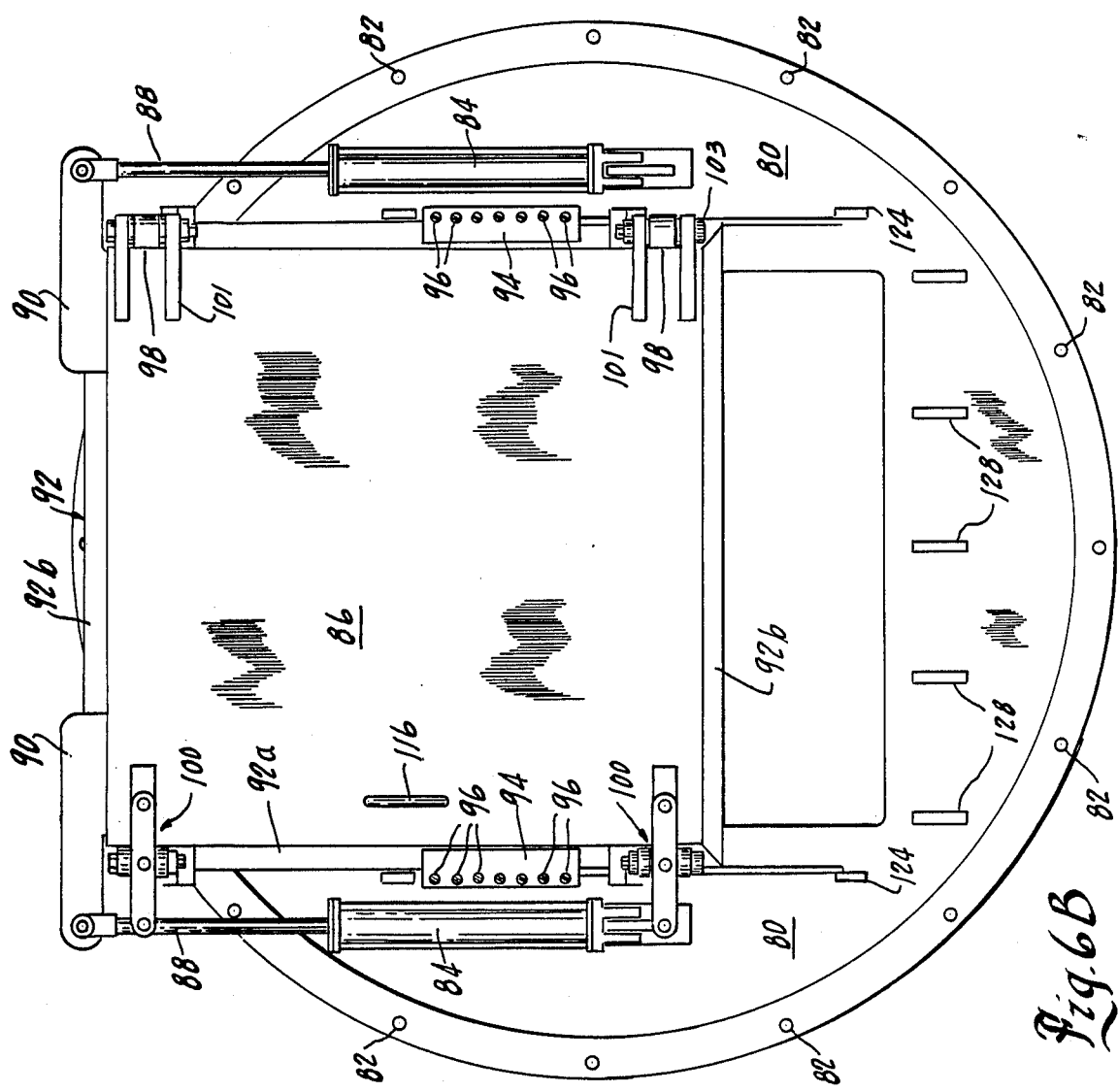
FIG. 6B is a front view of the front door assembly of FIG. 6A with the front door assembly in its raised position.

The front door assembly 30 is shown in FIGS. 6A and 6B. Front head 80 is bolted to main chamber 22 with bolts 82. In the past, a rope seal had been used which periodically led to leaking. The bolted configuration avoids this problem. Bolts 82 do allow removal of head 80 for major work to be performed internally. Two hydraulic cylinders 84 are mounted to front head 80 on either side of a dual-action door 86. The upper ends of cylinder rods 88 have horizontal brackets 90 attached thereto. Door 86 eliminates the need for a separate ash removal door and room clearance for a large access door. Sagging of the door is also greatly reduced.

Brackets 90 also hold the top edge of a vertically slidable, rectangular frame 92 onto which door 86 is mounted. Side rails 92a of frame 92 are L-shaped in cross-section, as seen in FIG. 7A. Also seen in FIGS. 6A and 7A are guide plates 94 secured to front head 80 by a number of bolts 96. Side rails 92a run within guide plates 94 to limit the maximum distance between door 86 and head 80.

Hinges of standard configuration are provided on door 86. Lugs 98 are welded to the frame 92a. Two other members 101 are welded to door 86 and are on the upper and lower sides of each lug 98. A lug pin 103 extends through members 101 and lug 98. Opposite the hinges are locking mechanisms 100. As seen in FIG. 7B, locks 100 have a bracket 102 secured to door 86 with an extension 104 that extends beyond the left edge of door 86. Extension 104 engages a pivoting member 106. Member 106 has a hinged bracket 108 which pivots on a mounted bracket 110. Brackets 110, like lugs 98, are mounted to side rails 92a, and therefore move vertically with cylinder rods 88. Brackets 110 secure extension 104 with a screw 112 operated by handles 114.

To open the hinged door 86, one unscrews the locking mechanism 100 using handle 114. The bracket 106 then swings to the side, freeing extension 104 to move outwardly. A handle 116 is provided to assist in pivoting the door 86 open.

To ensure that a tight seal is maintained when door 86 is in its lowered position, a number of side cam locks 118 and bottom cam locks 120 are employed. Side locks 118 use moving members 122 welded to side rail 92a which engage stationary members 124 welded to front head 80. As door 86 is lowered, members 122 and 124 engage, the weight of door 86 pulling itself in toward head 80.

Similarly, bottom cam locks 120 have a moving member 126 mounted to lower rail 92b. This moving member 126 engages stationary lower members 128 when the door 86 is lowered. As with members 122, members 128 are welded to front head 80.

Finally, a unique labyrinth seal is used to prevent heat from escaping from the combustion chamber 22. The front plate 130 of door 86 has a perpendicular lip 132 about its periphery. Rails 92a and 92b have portions 134 extending perpendicular to front head 80. These portions 134 extend outward to plate 130 between the side plates 136 of door 86 and lip 132. Welded to each portion 134 are strips 138 which engage the tip of lip 132.

The labyrinth arrangement requires air attempting to escape chamber 22 to change directions a number of times, thereby inhibiting its flow outward. Once again, reliance on the leaky rope seals found in earlier devices is not necessary.

Ash Removal System

Figure 8:
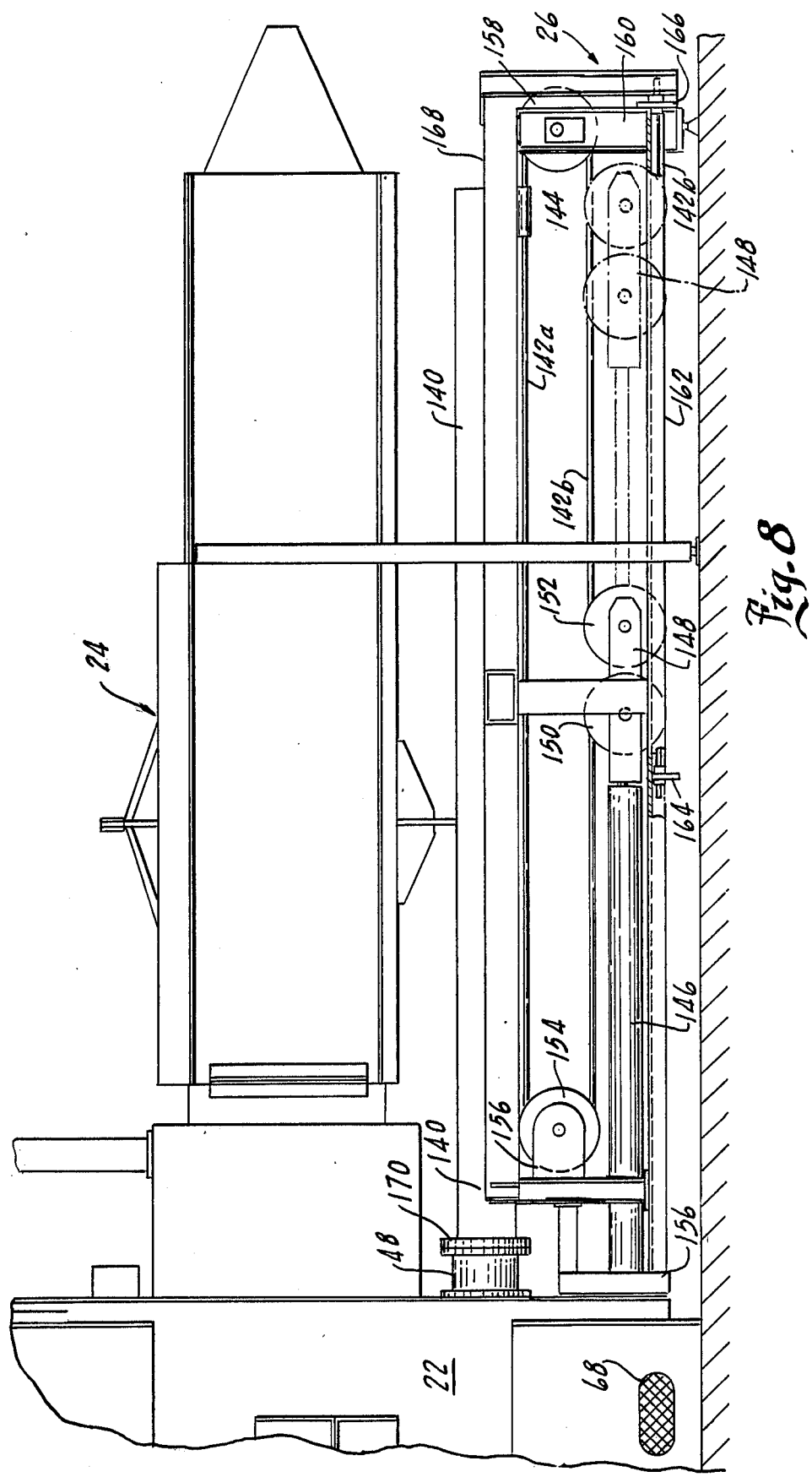
FIG. 8 is a side elevation plan view of the ash removal system.

The ash removal system 26 is shown in more detail in FIG. 8. An ash ram 140 is mounted to enter main chamber 22 through an ash ram port 48. The ash ram 140 is generally rectangular in cross-section and is designed to slide along the hearth plates 54 of the incinerator to push ash and debris toward the front head 80. A unique cable and cylinder system is utilized to operate the ash ram 140.

Ram 140 is connected to cables 142a and 142b by a sleeve 144 attached at the rear of ram 140. A hydraulic cylinder 146 utilizes a specially adapted piston mounting 148 onto which are mounted pulleys 150 and 152. A third pulley 154 is rotatably mounted to a bracket 156 adjacent the front end of ram 140. Similarly, a fourth pulley 158 is mounted on a rear bracket 160 and allowed to rotate. Cable 142a, secured to bracket 162 by clasp 164, extends around pulley 150 to pulley 154, then back along the length of ram 140. Cable 142b runs to rear pulley 158, around pulley 158 to pulley 152 and finally back to bracket 160 where the cable 142b is secured to a clasp 166.

When cleaning of the chamber 22 is desired, cylinder 146 is energized, thereby extending mounting bracket 148 rearward. The configuration of the pulleys, while only providing one-half ($\frac{1}{2}$) the force generated by cylinder 146, allows the ram 140 to travel twice as far as bracket 148. Therefore, a relatively minor amount of piston travel permits full length travel of the ram 140. As the cylinder bracket 148 retracts, the ash ram 140 is pulled back to its storage position outside the pyrolysis chamber.

Another advantage of this configuration is that no part of the cylinder or piston ever enters any hot areas directly above the hearth or within the combustion chamber 22. Likewise, the cylinder does not need to be extended the entire length of the chamber either by itself, or in tandem with another cylinder or cylinders. Therefore, there is no extreme torquing as in earlier configurations or overleading of the cylinder (caused by double welding cylinders). Likewise, no undercarriage is required because the rails 168 on which the ram runs, along with the support given by cable 142 in mounting sleeve 144, keep the cylinder in line and horizontal and therefore obviate the need for the undercarriage. An appropriate wiper mechanism 170 may be installed at port 48 to seal the ram 140 from any combustion activity in chamber 22. The front door assembly 30 is part of the ash removal cycle in that it is raised to allow ash to be pushed out.

Thermal Reactor

The thermal reactor of the present incineration system is shown in FIG. 9 in more detail. The thermal reactor 28 is a staged combustion process system which uses forced air combustion instead of a diffusion flame. Gasified combustion material from the pyrolysis chamber 22 enters the thermal reactor in its premixer section 172. At this stage, a plenum 174 connected to TRCA fan 67 forces combustion air through a number of holes 176 as seen in FIG. 9A which are oriented to move the gasified material further down the thermal reactor in an axial manner. The air/fuel mixture next reaches the ignitor section 178, which has a pair of ignitors 180 and a pair of view ports 181 for observing ignition. The ignitors 180 impart a clockwise rotation to the air/fuel mixture as it is ignited. After ignition, the air/fuel mixture encounters a second series of combustion air orificies 184 seen in FIG. 9B.

The reactor walls then form an air expansion section 186 in which are located a third set of air holes 188 shown in detail in FIG. 9C. While ignitors 180 have imparted a clockwise spin to the combustion mixture, air holes 184 reverse that orientation by inducing a counter-clockwise combustion air spin with air coming in through those holes. Similarly, holes 188 again reverse the orientation of the spin of the combustion mixture within the thermal reactor 28, causing the clockwise spin to be induced to the combustion mixture when it goes through air expansion section 186. This multiple reversal of spin directions improves mixing of the combustion air with the fuel. Air added to the combustion mixture through holes 176, 184, 188 is added in a stoichiometric fashion so that burning of the combustion mixture takes place in a step-wise fashion. In addition, the expanding diameter of the thermal reactor forces the combustion mixture, as it burns, to seek out a larger volume and therefore proceed through the reactor without causing pockets of gas to circulate within the reactor.

Air for holes 184 and 188 is provided through another collar 190 which, like collar 174, is supplied with combustion air from TRCA fan 67. The combustion mixture enters the secondary combustion section 192 which includes a burner apparatus 194 having a view port 195 across therefrom. In the preferred embodiment, an gas burner is placed here to assist in burning the combustion mixture. Additionally, a combustion extension section 196 is added to prolong the residence time of the combustion mixture in the thermal reactor 28. As can be seen in FIG. 9, the reactor then terminates with a reducer section 198 which feeds the gases of combustion to an appropriate stack apparatus 29 after passing through a retention chamber 31.

The above-described thermal reactor design permits complete control of all combustion and, therefore, the air/fuel ratio control at each stage of combustion. Likewise, there is no exposed flame and a greatly reduced dependency on room combustion air supply.

With more demanding federal, state and local regulations with respect to emmissions, the reactor design disclosed herein provides the operator with the ability to maintain temperature and time requirements for the retention of the gases without having to guess as to air flow and burning characteristics. In addition, the high degree of air/fuel ratio control improves the combustion efficiency, as does the reverse rotation turbulence mixing of the combustion mixture. Any desired temperature characteristics may be maintained by altering or maintaining air/fuel ratios as well.

The pyrolysis incineration system described herein is designed to accomplish several specific functions. The pyrolysis function is efficiently performed in the pyrolysis chamber 22. The gases generated therein are completely burned in the thermal reactor 28 which maintains minimum combustion temperatures. Finally, the retention chamber 31 holds the products of combustion exiting the thermal reactor 28 at a minimum temperature for a specified time. Each part of the system is designed to accomplish these tasks without compromising performance. Other devices that have done so by attempting to combine functions, such as combustion and retention, fail to provide an effective system.

Variations, modifications and other applications will become apparent to those skilled in the art. Therefore, the above description of the preferred embodiment is to be interpreted as illustrative rather than limiting. The scope of the present invention is limited only by the scope of the claims that follow.

What is claimed is:

1. An incineration system comprising:
    a pyrolysis chamber for gasifying materials, said chamber comprising a generally cylindrical wall, a circular front head and a circular rear head, the interior of said chamber being lined with refractory material, said cylinder wall having an upper opening designed to be an exit for said gasified materials from said chamber, the lower portion of said chamber being lined with refractory material forming a generally planar floor with a support ridge extending longitudinally down the center thereof and the sides of the interior of said chamber having longitudinal support grooves cut therein;

a flat hearth comprising a plurality of plates made of nonporous material, opposing sides of said plates being support edges, one of said edges on each plate being designed to sit on one of said support grooves and the opposing edge of each plate being designed to sit on said support ridge, each said plate having a plurality of apertures evenly distributed therein to provide fluid communication from the lower surface of each said plate to its upper surface, a nipple surrounding the upper edge of each said aperture on the upper surface of said plate;

the front head of said chamber being bolted to said cylindrical wall and having a generally rectangular passageway therein, said passageway of said front head being covered by an access assembly vertically movable between a first lower position and second raised position, means for raising and lowering said access assembly, wherein when said access assembly is in said lower position said assembly seals said interior of said chamber from the atmosphere;

a system for cooling said cylindrical wall and said rear head of said pyrolysis chamber, said cooling system comprising a skirt mounted to the lower portion of said cylindrical wall and having an intake for atmospheric air, a plurality of lower inlets in each side of said cylindrical wall, a plurality of upper outlets in each side of said cylindrical wall, a curved wall segment mounted to the interior of each side of said cylindrical wall and connecting said lower inlets and upper outlets on respective sides of said cylindrical wall, a plenum on the upper portion of said cylindrical wall connecting said upper outlets, a fan mounted to said plenum designed to draw air through said intake, said inlets and said outlets to said plenum, a plurality of ducts in said rear head through which said fan directs the air, and a plurality of orifices at the bottom of said ducts designed to inject air into the interior of said chamber between said floor of said chamber and said hearth;

ash removal means comprising a ram movable between a first retracted position and a second extended position, external means for extending and retracting said ram, a rear access assembly for selectively permitting access of said ram to the interior of said chamber;

a thermal reactor comprising a cylindrical premixing section connected to said upper opening of said chamber and having first air jets designed to inject a preselected amount of combustion air directed into said premixing section and away from said upper opening and imparting an axial direction to the combustion air and gasified materials, a cylindrical igniter section connected to said premixing section designed to ignite said gasified materials and combustion air while imparting a swirl in a first rotational direction, and further designed to inject an additional preselected amount of combustion air directed away from said premixing section through second air jets imparting a swirl in a second rotational direction, a frusto-conical expansion section designed to inject an additional preselected amount of combustion air directed away from said igniter section through third air jets imparting a swirl in said first rotational direction, and a cylindrical combustion section in which said combustion air and gasified materials may burn.

2. An incineration system comprising a cylindrical pyrolysis chamber designed to gasify waste materials, and havng a generally planar floor with a support ridge extending longitudinally down the center thereof and the sides of the interior of said chamber having longitudinal support grooves cut therein, the improvement comprising a flat hearth inside said chamber, said hearth supporting the waste materials to be burned and comprising a plurality of plates made of nonporous material, opposing sides of said plates being support edges, one of said edges on each plate being designed to sit on one of said support grooves and the opposing edge of each plate being designed to sit on said support ridge, each said plate having a plurality of apertures perpendicular to said plate and evenly distributed therein to provide fluid communication from the lower surface of each of said plate to its upper surface, a unitary cast nipple surrounding the upper edge of said said aperture on the upper surface of said plate each said nipple tapering upwardly from the surface of said plate to the upper edge of said said aperture.

3. The incinerator system of claim 2, wherein said one of said edges of said plates includes a longitudinal groove defining a downwardly extending longitudinal margin, said margin arranged for seating engagement with the said longitudinal support groove.

4. An incineration system comprising a pyrolysis chamber designed to gasify waste materials, said chamber comprising a generally cylindrical wall and having a circular front head, the improvement comprising said front head of said chamber being bolted to said cylindrical wall and having a generally rectangular passageway therein, said passageway of said front head being covered by an access assembly vertically movable between a first lower position and second raised position and horizontally pivotable between a first closed position and a second open position, means for raising and lowering said access assembly, wherein when said access is in said lower position said assembly seals said interior of said chamber from the atmosphere.

5. The incinerator system of claim 4, wherein said access assembly includes a vertically slidable door for normally covering said passageway, vertically disposed guide rail means for slidably receiving said door and a hydraulically operated cylinder having an operating plunger operatively connected to said door for alternatively raising and lowering the door.

6. The incinerator system of claim 5, wherein a plurality of cooperating cam locking members are respectively mounted on said front head and on said door and arranged to force said door towards sealing engagement with said front head upon lowering said door by means of said hydraulically operated cylinder.

7. The incinerator system of claim 4, wherein said access assembly includes a dead-action door, a supporting frame having a pair of oppositely disposed side rails, hinge members attached to said door and one of said side rails for pivotally supporting the door, a locking mechanism on the opposite side rail for securing the door to said frame.

8. The incinerator system of claim 4, wherein said access assembly includes a door for covering said opening, and wherein said door includes a labyrinth seal comprising an integral perpendicular lip laterally extending from the periphery of said door, said lip and said door defining a groove, L-shaped side rails secured at one side to said front head and having the other side thereof extending within said groove to inhibit the flow of air flowing from and into said pyrolysis chamber.

9. An incineration system comprising a pyrolysis chamber designed to gasify waste materials, said chamber comprising a generally cylindrical wall and having a circular front head and a circular rear head, a flat hearth inside said chamber and elevated above the floor of said chamber, the improvement consisting of an assembly for providing preheated combustion air to said chamber and for cooling said cylindrical wall and said rear head of said pyrolysis chamber, said cooling assembly comprising a skirt mounted to the lower portion of said cylindrical wall and having an intake for atmospheric air, a plurality of lower inlets in each side of said cylindrical wall, a plurality of upper outlets in each side of said cylindrical wall, a curved wall segment mounted to the interior of each side of said cylindrical wall and connecting said lower inlets and upper outlets on respective sides of said cylindrical wall, a plenum on the upper portion of said cylindrical wall connecting said upper outlets, a fan mounted to said plenum designed to draw air through said intake, said inlets and said outlets to said plenum, a plurality of ducts in said rear head through which said fan directs the air, and a plurality of orifices at the bottom of said ducts designed to inject air into the interior of said chamber between said floor of said chamber and said hearth.

10. The incineration system of claim 9, wherein said chamber is defined by cylindrically arranged refractory material, and wherein said cylindrical wall comprises spaced apart cylindrical enclosure members, one of said enclosure members adjacent to and supporting said refractory material, both of said cylindrical members cooperating to define an airflow chamber therebetween, said airflow chamber communicating with said upper outlets and said lower inlets.

11. An incineration system comprising a pyrolysis chamber designed to gasify waste materials, the improvement consisting of ash removal means comprising a ram movable between a first retracted position and a second extended position, external means for extending and retracting said ram, an access assembly for selectively permitting access of said ram to the interior of said chamber;
wherein said external means for extending and retracting said ram comprises:
a hydraulic cylinder, including a piston rod which may be extended a preselected distance;
pulley means coupled to said piston rod;
cable means engaging said pulley means and connected to said ram so that said ram travels twice the distance as said piston rod when said piston rod is extended or retracted, and
wherein said hydraulic cylinder, said pulley means and said cable means all remain outside said chamber.

12. The incinerator system of claim 11, wherein said ram is supported for longitudinal movement externally of said chamber by at least one stationary rail.

13. The incinerator system of claim 11, wherein said pulley means comprises four pulleys including a first and second laterally spaced, rotatable pulleys, and a third and fourth rotatable pulleys mounted in laterally spaced relationship on said piston rod, said piston, piston rod and said third and fourth pulleys disposed between said first and second pulleys, and wherein said cable means comprises a first and a second cable joined together at one end thereof and secured at said one end to said ram, the first cable extending around said first ram, the first cable extending around said first stationary pulley and around said third pulley mounted in said piston rod and having the other end of said first cable secured to a stationary support, and said second cable extending around said second stationary pulley and around said fourth pulley mounted on said piston rod and having the other end of said second cable secured to a stationary support.

14. The incinerator system of claim 13, wherein said third and fourth pulleys mounted on said piston rod are located approximately equidistant between said first and second stationary pulleys.

15. An incineration system comprising a pyrolysis chamber designed to gasify waste materials, said chamber having an upper opening for exhausting said gasified material from said chamber, the improvement in said system comprising a thermal reactor comprising a cylindrical premixing section connected to said upper opening of said chamber and having first air jets designed to inject a preselected amount of combustion air directed away from said upper opening into said premixing section and imparting an axial direction to the combustion air and gasified materials, a cylindrical ignitor section connected to said premixing section designed to ignite said gasified materials and combustion air while imparting a swirl in a first rotational direction, and further designed to inject an additional preselected amount of combustion air directed away from said premixing section through second air jets imparting a swirl in a second rotational direction, a frusto-conical expansion section designed to inject an additional preselected amount of combustion air directed away from said igniter section through third air jets imparting a swirl in said first rotational direction, and a cylindrical combustion section in which said combustion air and gasified materials may burn.

16. The incinerator system of claim 15, wherein the said first air jets are circumferentially spaced substantially equidistant from one another and are directed angularly relative to a perpendicular plane intersecting the longitudinal axis of said mixing chamber and towards the forward end of said mixing chamber.

17. The incinerator system of claim 15, wherein said igniter section includes at least one igniter directed inwardly and in a direction substantially normal to the longitudinal axis of said igniter section, thereby imparting a swirl or rotation to the axially transported, premixed air and gasified materials ignited by said igniter.

18. The incinerator system of claim 15, wherein said second air jets are circumferentially spaced substantially equidistant from one another and are directed angularly relative to a perpendicular plane intersecting the longitudinal axis of said igniter section and toward the forward end of said igniter section, said second air jets each respectively being directed rotationally relative to and in a first longitudinally angular direction, thereby to impart a swirl to the axially transported, ignited and premixed air and gaseous materials in said second rotational direction.

19. The incinerator system of claim 15, wherein said third air jets are circumferentially spaced substantially equidistant from one another and are directed angularly relative to a perpendicular plane intersecting the longitudinal axis of said frusto-conical expansion section, and towards the forward end of said expansion section, said third air jets each respectively being directed rotationally relative to and in a second longitudinally angular direction, thereby to impart a reverse swirl to the axially transported, ignited and premixed air and gaseous materials in said first rotational direction.

* * * * *